United States Patent

Koshi et al.

Patent Number: 5,821,969
Date of Patent: Oct. 13, 1998

[54] IMAGE FORMING APPARATUS

[75] Inventors: Yutaka Koshi; Shinji Shishido; Setsu Kunitake; Shunichi Kimura; Akihiro Andoh; Koh Kamizawa, all of Ashigarakami-gun, Japan

[73] Assignee: Fuji Xerox Co., Ltd., Tokyo, Japan

[21] Appl. No.: 728,093

[22] Filed: Oct. 9, 1996

[51] Int. Cl.⁶ .................................................. H03M 1/82
[52] U.S. Cl. ........................ 347/116; 347/153; 358/261.2
[58] Field of Search ................................ 347/115, 116, 347/153, 234, 248; 399/299, 301, 306; 358/262.1, 427, 539, 296, 426; 395/101, 103

[56] References Cited

U.S. PATENT DOCUMENTS

| | | | |
|---|---|---|---|
| 5,138,561 | 8/1992 | Crowe | 395/103 |
| 5,157,505 | 10/1992 | Hashimoto et al. | 358/296 |
| 5,274,428 | 12/1993 | Wong et al. | 347/115 |
| 5,485,287 | 1/1996 | Nakamura et al. | 358/426 |

FOREIGN PATENT DOCUMENTS

A 0427466  5/1991  European Pat. Off. .
A 0454759  5/1995  European Pat. Off. .

OTHER PUBLICATIONS

"International Standard of Multimedia Coding" published by Maruzen K.K. in 1991, pp. 14 to 47.

*Primary Examiner*—N. Le
*Assistant Examiner*—Hai C. Pham
*Attorney, Agent, or Firm*—Oliff & Berridge, PLC

[57] ABSTRACT

In an image forming apparatus, memory capacity necessary for temporarily retaining image data is reduced. A decoding process is carried out by diving image data for one frame into element data for each color component Y, M, C and K. The element data for each color component is stored in the temporary memory. A controller starts conveyance of recording media on the basis of estimation of the completion time of decoding processing by a decoding speed estimator, and controls the recorders for Y, M, C and K to execute the recording process of element data retained in the temporary memory. This results in an image being recorded on the recording medium for each element data retained in the temporary memory, such that the conveyance of the recording media and the supply of data to the recorders for Y, M, C and K are matched, and the data amount to be retained in the temporary memory is reduced.

9 Claims, 13 Drawing Sheets

Main scanning line direction

IMAGE FORMING APPARATUS

BACKGROUND OF THE INVENTION

1. Field of the Invention

The present invention relates to an image forming apparatus such as a print device, and more, particularly to an image forming apparatus for processing image data by dividing the image data into color components or partial images.

2. Description of the Related Art

Recently, in communication of image data through a network or in storing image data in a memory, the image data have been coded and compressed in order to reduce an amount of data.

There are various systems for coding static images. Among them, an influential coding system is a JPEG (Joint Photographic Coding Experts Group) system using a DCT (Discrete Cosine Transform based on an in-frame correlation ("International Standard of Multimedia Coding" published by Maruzen K.K. in 1991, p. 14 to 47; and "DCT Coding System Using Adaptive Quantization" written in Treatise of Image Electronics Society in 1991, Vol. 20, No. 5, p. 467 to 475).

In an image forming apparatus such as a color copier or a color printer for printing and outputting images from image data, coded image data are decoded and extended, and after this, color images are printed on a recording sheet.

As a color printer, there is a so-called tandem system color printer for printing inks of color components, yellow (Y), magenta (M), cyan (C) and black (K) on a recording sheet in a superposed fashion, similarly to a color process printing.

In this color printer of a tandem system, recorders exclusive for color components are provided. These recorders can be pipeline-operated relative to a recording sheet to be conveyed to bring a throughput of a color print close to the case of a monochromatic print. For example, in case of a laser beam printer using an electrophotographic process, recorders exclusive for color components are arranged so that a recording sheet is conveyed at a process speed, and the respective recorders record images with inks of respective color components on the recording sheet while adjusting to the process speed. Since the throughput of the image recording is determined depending on the process speed, in the tandem system color printer, four colors can be recorded with the same throughput as the case of recording with single black.

Accordingly, if the process speed is made high, the throughput in the color printer can be enhanced. However, actually, it is very difficult to change the process speed for the reasons mentioned below.

For example, design parameters of processes (such as a developing process, a transfer process, and a fixing process) constituting the electrophotographic process should be designed on the basis of determined process speed. In order to render the process speed variable, all the parameters of related processes should be made variable. It is therefore actually very difficult to match all the changed parameters.

Under these circumstances, the process speed is set constant. Thus, unless image data are supplied to the recorders at the constant speed according to the process speed, white recording sheets are ejected or images disturbed in the midst are printed on the recording sheets. Accordingly, the image data have to be supplied to the recorders at the constant speed. However, in the case where the image data are supplied while being coded, decoding processing should be taken adjusting to printing processing by the recorders.

Particularly, in the case where the coding system is of a reversible coding system, the decoding speed generally depends on an original. Therefore, the decoding speed becomes varied with image data, failing to secure a supply of image data to the recorders constant.

In the case where the coding system is of a reversible coding system, for example, code-quantity control is performed so as to be a constant code quantity per page, and a decoding speed can be made constant. Generally, in the case where an image is non-reversibly coded, the smaller the code quantity the larger the deterioration in quality. An image hard to be coded (for example, an image constituted by a random noise) has properties in that a deterioration in quality in the case where coding is made with the same code quantity is larger than that of a normal image (for example, a figure or a natural image such as a landscape). Because of this, in the case where the code quantity control is performed to code various images with the constant code quantity, the deterioration in quality increases according to the images, sometimes failing to maintain the quality durable for practical use.

Accordingly, in the case where the image data are supplied in a coded form, if an attempt is made to make assure of quality, it becomes difficult to make the decoding speed constant, making it difficult to supply the image data at constant speed to the recorders.

In the case where it is difficult to make the decoding speed constant, decoded image data are temporarily retained in a buffer memory so that the image data are supplied from the buffer memory to the recorders. This enables a supply of image data to recorders at constant speed to prevent white paper from being ejected or images disturbed in the midst from being printed.

FIG. 14 shows the construction of a color printer of a tandem system provided with a buffer memory 101 as described above. In this color printer, coded image data preserved in a magnetic disk device 12 which is an external memory are decoded by a decoder 103 and image data per page are temporarily retained in the buffer memory, and image data of color components are supplied from the buffer memory 1 to recorders 104Y, 104M, 104C and 104K of color components, yellow, magenta, cyan and black. A controller 105 for controlling the decoding processing by the decoder 103 controls the feed of recording sheets from a sheet feeder 106. Recording sheets are conveyed by a sheet conveyor 107 to printing positions by recorders in synchronism with a supply of image data to the recorders 104Y, 104, 104C and 104K to case the recording sheets to pass through the recorders 104Y, 104M, 104C and 104K whereby the images are recorded in a superposed fashion with color inks.

In the color printer of a tandem system as described, recording sheets are subjected to the pipeline processing to increase the throughput. When the recording sheets cannot be continuously passed through the recorders 104Y, 104M, 104C and 104K of the respective colors, the throughput lowers.

Because of this, in the case where a plurality of the same originals are continuously printed, the recording sheets may be continuously charged into the pipeline at the time when the image data for one page are ready. That is, as shown in FIG. 15, the controller 105 gives decoding instructions to the decoder 103 (Step S1) and receives a notice that image data for one page are decoded and retained in the buffer memory (Step S2). Then the controller 105 gives sheet-feed instructions to the sheet feeder 106 (Step S3) to cause the feeder 106 to start the conveyance of recording sheets. When a predetermined number of recording sheets are conveyed and the same kind of originals retained in the buffer memory 101 are recorded by the recorders 104Y, 104M, 104C and 104K, respectively, the processing is completed (Step S4).

In the case where a plurality of different kinds of images are printed, for example, buffer memories 101 in the number of kinds of images are provided, and when all the image data are ready for the buffer memories 101, the recording sheets can be continuously charged into the pipeline.

However, if all the image data of different kinds should be prepared, an enormous capacity of buffer memories 101 is required, lacking in reality in terms of cost and performance. For example, when the buffer memory 101 is constituted by a relatively expensive semiconductor memory, a greater part of printer cost is occupied by the memory cost. Alternatively, when the buffer memory 101 is constituted by a relatively inexpensive magnetic disk, since the data transfer speed of the magnetic disk is greatly low as compared with the recording speed, a plurality of magnetic disks should be operated in parallel, and as a result, a greater part of the printer cost is occupied by the cost required for the magnetic disks.

In order that a plurality of images of different kinds are printed while suppressing the cost required for the buffer memory 101, the operation of preparing image data for one page for the buffer memory 101 and continuously charging recording sheets in the number required for recording the images may be repeated for the kinds of image data.

That is, as shown in FIG. 16, the controller 105 gives decoding instructions relating to the first page to the decoder 103 (Step S11) and receives a notice that image data for one page are decoded and retained in the buffer memory 101 (Step S12). Then the controller 105 gives sheet-feed instructions to the sheet feeder 106 (Step S13) to cause the feeder 106 to start the conveyance of recording sheets. When a predetermined number of recording sheets are conveyed and the images retained in the buffer memory 101 are recorded by the recorders 104Y, 104M, 104C and 104K, respectively (Step 14), the controller 105 gives decoding instructions relating to the next page to the decoder 103 (step S11), and the processings (Steps S12 to S14) similar to the above are repeated.

However, in the case where as described above, image data for one page are prepared for the buffer memory 101, the recording with respect to the necessary page to the recording sheet is completed and after this the next page is decoded and retained in the buffer memory 101, the throughput greatly lowers and the practicability becomes very low.

In view of the foregoing, a recording method has been employed in which the buffer memory 101 enough to retain image data for all pages is not required and the lowering of the throughput is suppressed to a allowable degree. That is, the decoding processing for each page is performed at different time so that after image data for a previous page retained in the buffer memory has been output to some extent, image data for a next page is retained in the buffer memory 101 to thereby reduce a quantity of data retained in the buffer memory 101, and data for a plurality of pages are retained in the buffer memory 101 to approach the time capable of starting the recording of next page relative to previous page to prevent the throughput from being lowered.

As for example, the recorders 104Y, 104M, 104C and 104K decode pages of different images at different time required for recording and the images are recorded sheet by sheet. The processing as shown in FIG. 17 is then performed. In the figure, the axis of abscissae indicates the time. Below the timing at which recording sheet for each page is processed is indicated a capacity of a buffer memory required at that time by a memory capacity (one plane) for one page and one color.

First, in the processing of the first page, image data (for 4 planes) of color components of yellow (Y), magenta (M), cyan (C) and black (K) are decoded and retained in the buffer memory 101. Then, recording sheets are conveyed to the leading position of the row of recorders, and thereafter the recording sheets are conveyed between the recorders 104Y, 104M, 104C and 104K. Recordings are sequentially performed on the basis of image data of color components. As a result, after the time of 6 units, images for the first page are recorded on the recording sheet in a superposed fashion with color inks, and a data retaining capacity of the buffer memory 101 for the first page is empty "0.1" The second page is processed in parallel under the state delayed by one unit time, and the third page is processed in parallel under the state delayed by one unit time. In this manner, the capacity of the buffer memory 101 required every termination of recording processing for one plane is reduced "1" by "1" and the respective pages are sequentially processed in parallel.

That is, in the above-described example, if the pipeline is filled after the time of 6 units from the start of printing and the buffer memory 101 has the memory capacity for 18 planes at a maximum, different images can be recorded on recording sheets continuously charged.

In the case of the color printer of a tandem type as described above, data for a plurality of pages are retained in the buffer memory 101 to thereby enable the continuous charge of recording sheets to perform recording processing while preventing the throughput from being lowered.

These situations are also true for the monochromatic printer. In order to supply image data to recorders so as to be in time for recording processing, it is necessary that even in the case of recording one kind of images, image data for one page at a minimum are temporarily retained in the buffer memory and the image data are supplied from the buffer memory to the recorders.

In the case where images of different kinds are recorded on recording sheets continuously charged, it is necessary to temporarily retain image data for two pages at a minimum in the buffer memory in order to continuously supply the data of different image pages as described.

In the color printer of a tandem type as described above, in the case where the process speed is constant and the supply speed of the image data cannot be assured, it is necessary to provide the buffer memory 101 for which read speed is assured. Particularly, in the case where a plurality of images of different kinds are printed, even if recording sheets are intermittently charged into the pipeline, a buffer memory for the depth of the pipeline is necessary. In the FIG. 17 example, a buffer memory for 18 planes is necessary.

When the buffer memory 101 is constituted by a semiconductor memory whose data access speed is high, in case of image data of resolution of JIS A4 Format, 400 (dot/25.4 mm) and gradation accuracy of each pixel 8 (bit/pixel), a data quantity for one plane is about 16 (MByte). Therefore, a large capacity memory of about 288 (Msyte) in total for 18 planes is necessary,, resulting in a considerable increase in printer cost.

Further, also in the monochromatic printer, in order to continuously print data for different kinds of image pages, a memory of capacity of about 32 "MByte" in total for two pages at a minimum is necessary, resulting in a considerable increase in printer cost caused by the memory cost.

SUMMARY OF THE INVENTION

The present invention has been accomplished in view of the circumstances noted above with respect to prior art. It is an object of the present invention to provide an image forming apparatus for further reducing a memory capacity necessary for temporarily retaining image data.

According to the present invention, image data for one frame is divided into a plurality of elements such as color components or partial images, and these element data are temporarily retained in memory means as a buffer memory with respect to recording means. The timing is adjusted to the time at which the element data are retained in the memory means to convey recording media such as recording sheets to recording means and record imaged based on the element data on the recording media.

According to an image forming apparatus, data processes such as a decoding process by data processing means, data supply process, receiving process, color correction process and intensifying process are performed by dividing image data for one frame into a plurality of elements, and data of these elements are retained in temporary memory means with respect to recording means. Control means causes, upon completion of the data process, conveyance means to start conveyance of recording media and causes recording means to execute recording process of the element data retained in the temporary memory means whereby images are recorded on the recording media in the state where the conveyance of the recording media and the supply of data to the recording means are matched.

Further, according to the present invention, the image forming apparatus is a so-called tandem type color printer provided with a plurality of recording means for lap-printing image elements every color component on a recording medium. The decoding process by decoding means is performed by dividing image data for one frame every color component, and data of these color components are retained in the temporary memory means. The apparatus further comprises estimation means for estimating the process completion time for each color component data by the decoding means, on the basis of which estimation the control means causes the conveyance means to start the conveyance of recording media and causes the recording means to execute the recording process of the color component data retained in the temporary memory means. That is, in the case where recording sheets are intermittently charged into a, pipeline by the control based on the above estimation in the tandem type color printer, the recording sheets are charged into the pipeline only when estimation is made so that the image data are prepared in the temporary memory means by the time when the recording sheets arrive at the recording means, and when the estimation is made so that the preparation of image data is not in time, the recording sheets are not charged and the timing between the supply of data to the recording means and the recording process by the recording means is coincided.

Thereby, the recording process by the recording means is not started after the image data for one frame has been retained in the temporary memory means but when the color component data are retained in the temporary memory means, the recording process based on the color component data is rapidly started by the corresponding recording means. Accordingly, the quantity of data that should be retained in the temporary memory means till the recording process is completed reduces in a short period of time, and the capacity of the temporary memory means required for the supply of data to the recording means reduces as compared with prior art.

The estimation for the time of completion of the decoding process by the estimation means is accomplished on the basis of the processing speed when data is coded, or the quantity of codes of color component data, the number of coded symbols or the time required for decoding color component data.

Furthermore, in the image forming apparatus according to the present invention, image data for one frame is divided by image division means in parallel with a main scanning line, and the obtained data of partial image elements are stored in image memory means. On the basis of the control by control means, supply means causes the temporary memory means with respect to the recording means to retain the partial image data stored in the image memory means and to execute printing process by the recording means.

By forming the image data for one frame into the partial image data as described above, the capacity required by the temporary memory means is reduced, and the cost used for the temporary memory means is reduced.

If a plurality of recording means for the printing process every color component data are provided, the images can be subjected to the recording process in the state where the partial image data are further divided into the color component data.

DESCRIPTION OF THE PREFERRED EMBODIMENTS

The image forming apparatus according to the present invention will be described hereinafter by way of one example in the form of a tandem type color printer with reference to FIGS. 1 to 8.

Figure 1:
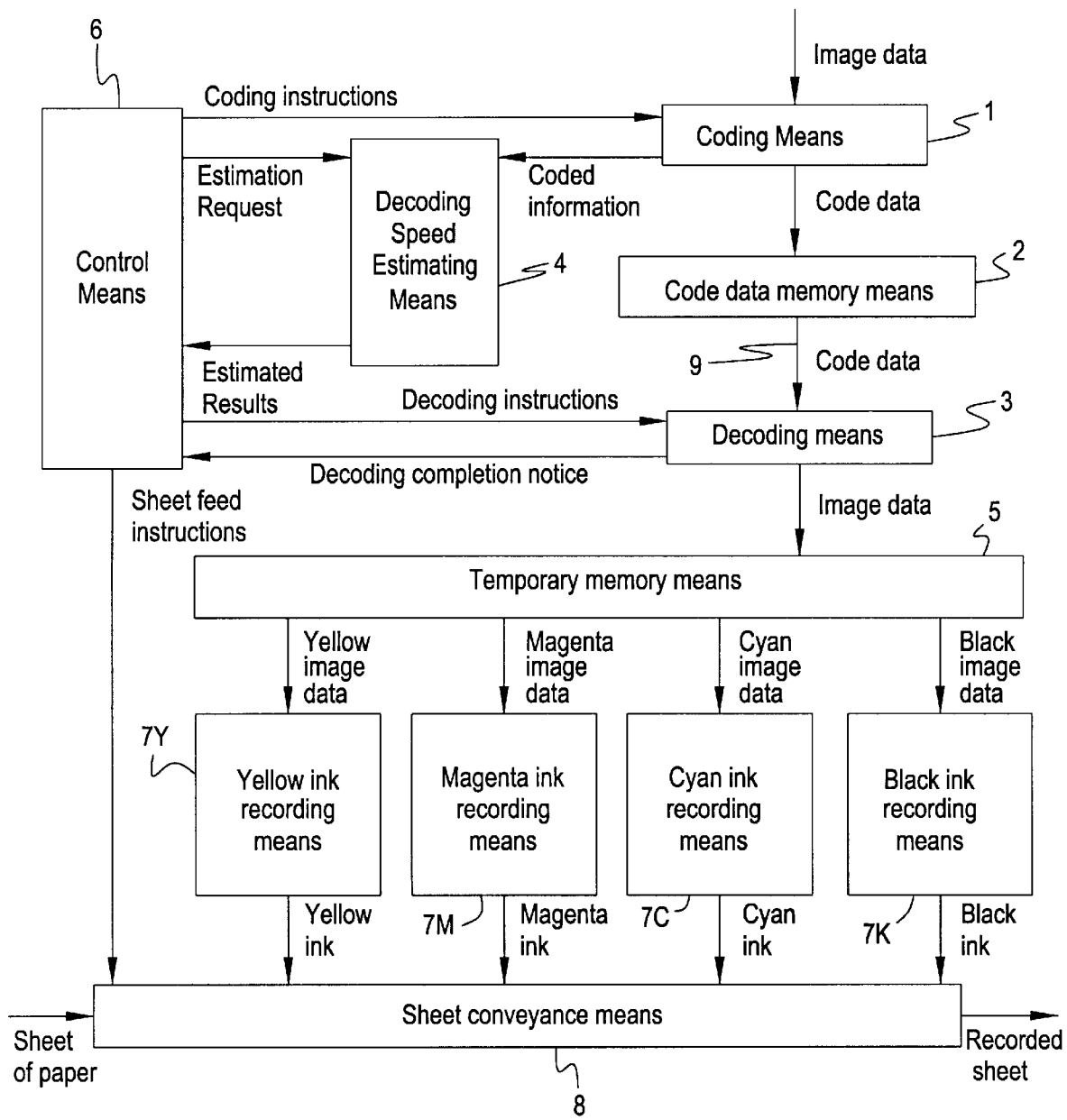
FIG. 1 is a schematic view showing the construction of an image forming apparatus according to one embodiment of the present invention.

As shown in FIG. 1, the tandem type color printer according to the present embodiment comprises coding means 1, coded data memory means 2, decoding means 3, decoding speed estimation means 4, temporary memory means 5, control means 6, four recording means 7Y, 7M, 7C and 7K, and sheet conveying means 8.

The coding means 1 codes image data in accordance with the coding instructions from the control means 6 and stores the coded data in the coded data memory means 2. In addition, the coding means 1 inputs coded information related to coding of image data into the decoding speed estimation means 4 in order to estimate the completion time of the decoding process as described later.

The coded data memory means 2 comprises a memory device such as a magnetic disk device, which stores coded data in a readable and writable manner.

The decoding means 3 reads and decodes the coded data from the coded data memory means 2 in accordance with the decoding instructions from the control means 6, and the obtained image data are retained in the temporary memory means 5.

The decoding speed estimate means 4 estimates the decoding speed by the decoding means 3 on the basis of coded information, the estimated result is preserved therein, and the estimated result is input into the control means 6 in accordance with the estimation request. The details of the process by the decoding speed estimation means 4 will be described later with reference to FIGS. 3 to 6.

The temporary memory means 5 comprises a buffer memory formed from a semiconductor memory, which temporarily stores image data in the recording means 7Y, 7M, 7C and 7K.

The control means 6 imparts the coding instructions to the coding means 1 to start coding of image data, imparts an estimation request to the decoding speed estimation means 4 to receive the estimated result relating to the decoding speed, and imparts the decoding instructions to the decoding means 3 to start decoding of coded data. The control means 6 determines whether or not the decoding process is completed till recording sheets arrive at a print start position of the recording means 7Y, 7M, 7C and 7K on the basis of the estimated result received. If determination is made to be in time, the control means 6 instructs the sheet conveyance means 8 to feed sheets.

The recorders 7Y, 7M, 7C and 7K correspond to color component data of yellow (Y), magenta (M), cyan (C) and black (K), respectively, and perform a lap-recording process on recording sheets conveyed with color inks. That is, recorders 7Y, 7M, 7C and 7K read image data of color components retained in the temporary memory means 5, and when sheets being conveyed by the sheet conveyance means 8 pass through the recorders 7Y, 7M, 7C and 7K, record images on the sheets in a superposed fashion with color inks based on the image data.

The sheet conveyance means 8 starts the conveyance of the recording sheets on the basis of the sheet feed instructions from the control means 6 to successively convey the sheets to the recorders 7Y, 7M, 7C and 7K, and ejects the sheets on which the images are superposedly recorded with color inks.

According to the tandem type color printer constructed as described above, a color image is printed on a recording sheet in the following procedure.

First, when the control means 6 imparts coding instructions to the coding means 1, the coding means 1 codes image data in accordance with the coding instructions, store the coded data in the coded data memory means 2, and inputs coded information into the decoding speed estimation means 4. Then, the decoding speed estimation means 4 estimates the decoding speed by the decoding means 3 from the coded information, preserves the estimated result therein, and inputs the estimated result in the control means 6 in accordance with the estimation request from the control means 6.

Upon receipt of the estimated result from the decoding speed estimation means 4, the control means 6 imparts the decoding instructions to the decoding means 3 and determines whether or not the decoding process is completed till recording sheets arrive at the recording means 7Y, 7M, 7C and 7K on the basis of the estimated result received. If determination is made to be in time, the control means 6 instructs the sheet conveyance means 8 to feed sheets. If not, the control means waits till being in time on the basis of the estimated result and then imparts the sheet feed instructions.

In parallel with the above-described process, the decoding means 3 reads and decodes coded data 9 from the coded data memory 2 in accordance with the decoding instructions to retain the decoded image data in the temporary memory means 5 so that the data can be immediately printed by the recording means 7Y, 7M, 7C and 7K.

When the corresponding image data of color components are retained in the temporary memory means 5, the recording means 7Y, 7M, 7C and 7K read the data, and the sheet conveyance means 8 starts the conveyance of recording sheets in accordance with the sheet feed instructions. When the recording sheets being conveyed pass through the recording means 7Y, 7M, 7C and 7K, the images based on the image data every color component are superposedly recorded on the recording sheets with color inks. Thereafter, the sheet conveyance means 8 continues to convey the recording sheets and ejects the recording sheets on which color images are recorded.

Figure 2:
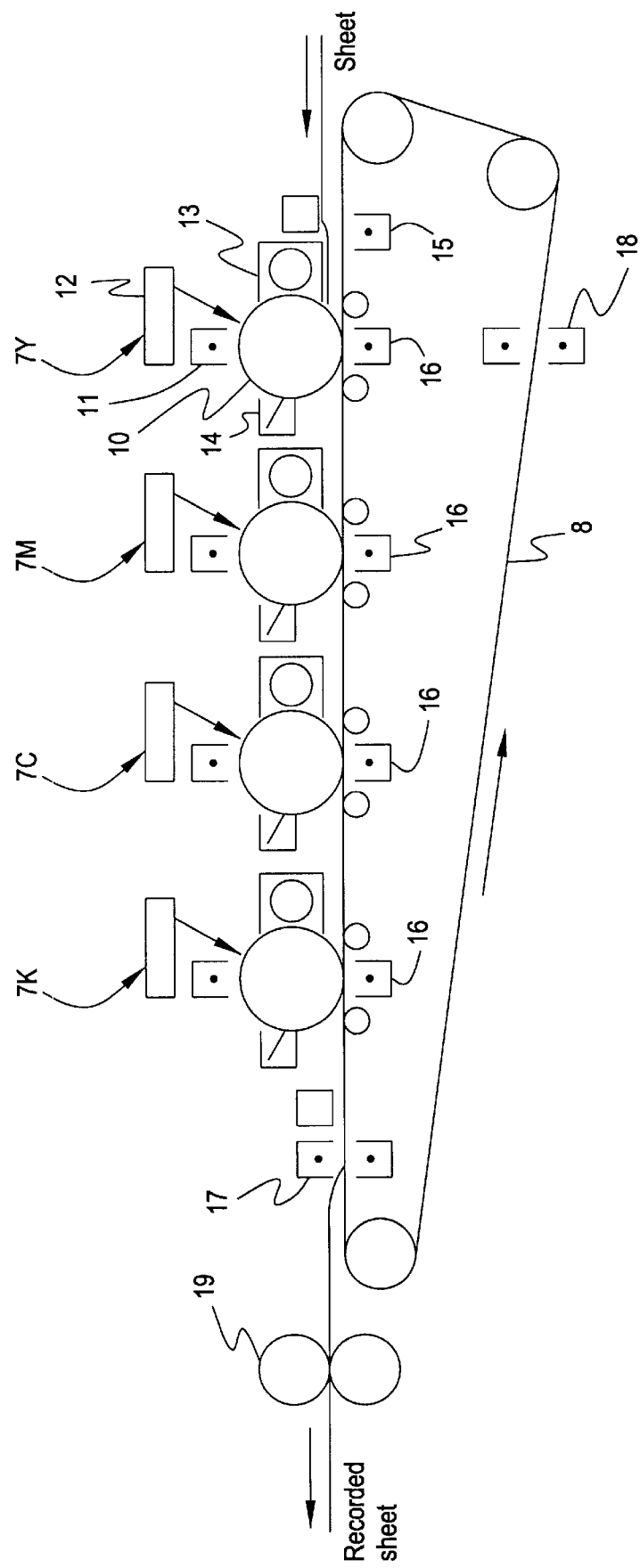
FIG. 2 is a schematic view showing the construction of a tandem type color printer embodying the image forming apparatus according to one embodiment of the present invention.

More specifically, the tandem type color printer constructed as described above can be realized in the form of a so-called tandem type color laser printer as shown in FIG. 2.

In this apparatus, toner images every color component are formed by four recording means 7Y, 7M, 7C and 7K corresponding to yellow (Y), magenta (M), cyan (C) and black (K), respectively, and the thus formed toner images are successively transferred to recording sheets conveyed by the sheet conveyance device of the transfer conveyance belt type to form color images.

The recording means 7Y, 7M, 7C, and 7K each comprise a charger 11, a laser scanning unit 12, a developer 13 and a cleaner 14 arranged around a photosensitive drum 10. The toner images every color component are formed on the photosensitive drum 10 via the steps of charging, exposing and developing, the toner images being electrostatically transferred to the recording sheets carried on the sheet conveyance device The sheet conveyance device 8 is constructed such that a transfer conveyance belt is stretched over a plurality of rolls including a drive roll. In the vicinity of the transfer conveyance belt are arranged a charger 15 for electrostatically adsorbing a recording sheet being fed from a supply tray (not shown) on the surface of the belt, a transfer corotron 16 for electrostatically transfer a toner image formed by each of the recording means 7Y, 7M, 7C and 7K to the recording sheet, a discharging corotron 17 for discharging the recording sheet electrostatically adsorbed on the belt, and a discharging corotron 18 for discharging the belt after the recording sheet has been stripped off.

Accordingly, when the recording sheet is conveyed while being adsorbed on the transfer conveyance belt 8, image data every color component are supplied from the temporary memory means 5 to a laser scanning unit 12 of each of the recording means 7Y, 7M, 7C and 7K and a toner image every color component is formed on the photosensitive drum 10 in each of the recording means 7Y, 7M, 7C and 7K. These toner images are successively transferred to the recording sheets being conveyed, and a color image on which the toner images of color components are superposed is formed on the recording sheet. Thereafter, the recording sheet stripped off from the transfer conveyance belt 8 is ejected to an ejection tray (not shown) via a fixing unit 19.

Figure 3:
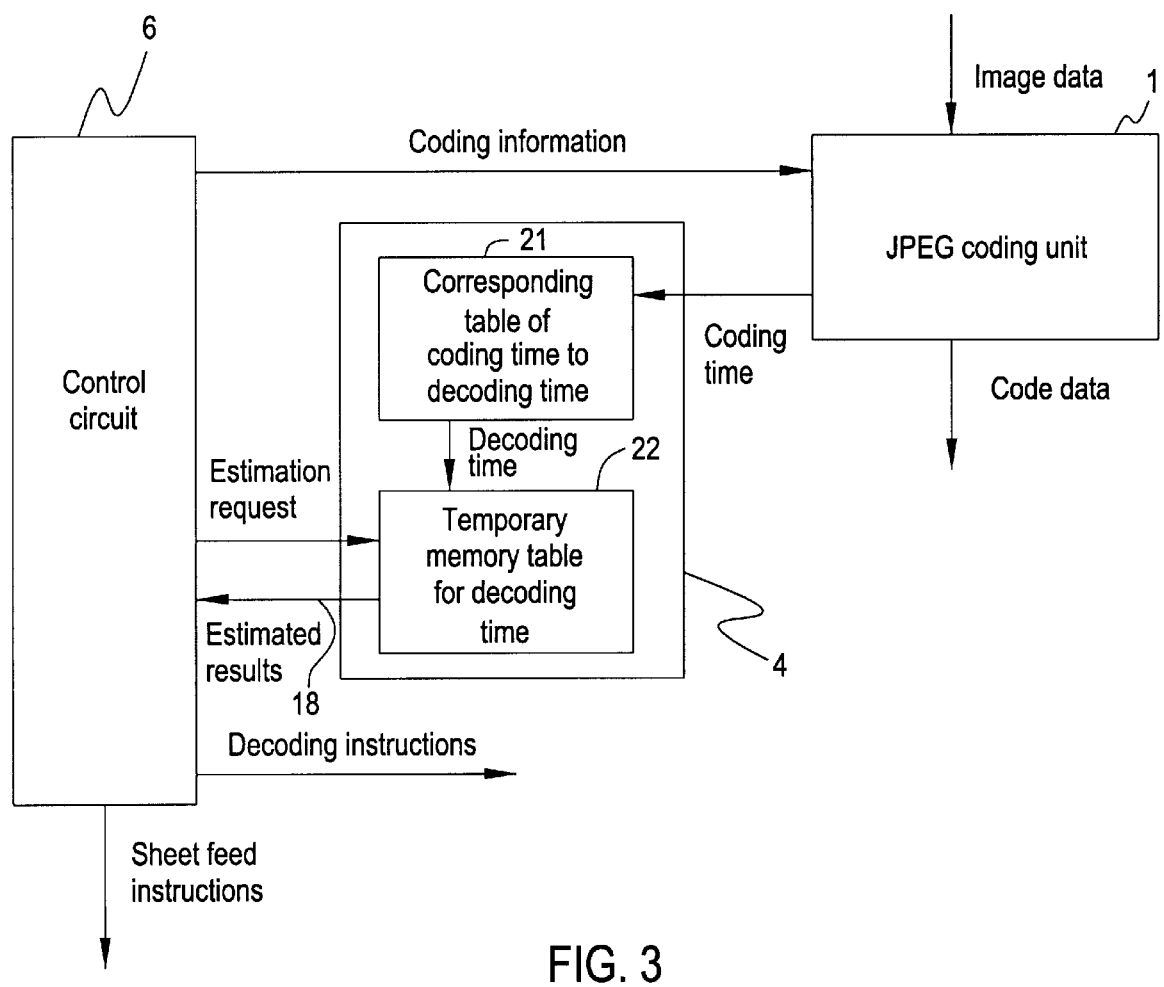
FIG. 3 is a schematic view showing an example of construction of, decoding speed estimation means.

FIG. 3 shows the detailed construction of the decoding speed estimation means 4 using a coding unit 1 of a JPEG system as coding means. In the estimation means 4, a decoding speed is estimated from a coding speed by the coding unit 1.

The JPEG coding unit 1 takes in image data, the image data being coded every color component (that is, every plane) for one page, and the coded data is output to the coded data memory means 2. When coding for one plane is completed, the JPEG coding unit 1 outputs, as coded information, the coding time required for the coding process of image data for one plane to the decoding speed estimation means 4.

Figure 4:
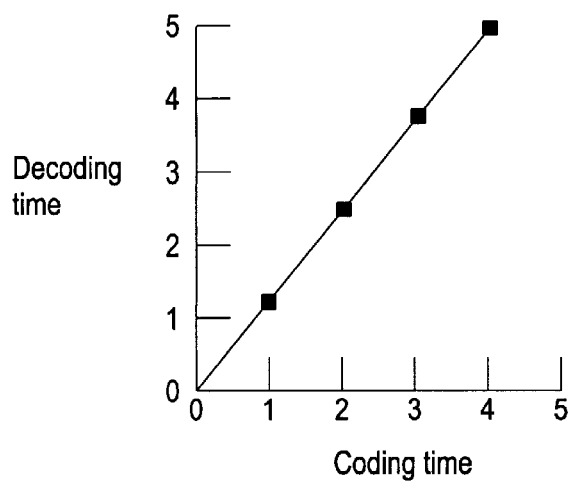
FIG. 4 is a graph showing one example of a relationship between the coding time and decoding time.

The decoding speed estimation means 4 comprises a corresponding table 21 between the coding time and the decoding time and a table 22 for temporarily storing the estimated result of the decoding time. The corresponding table 21 describes the corresponding relationship information between the coding time and the decoding time as shown in FIG. 4. When the coding time is input, the decoding time corresponding thereto is retained in the table 22.

The table 22 outputs the decoding time being retained as the estimated result 18 in accordance with the estimation request from the control means 6 and the control means 6 the outputs the sheet feed instructions to the sheet conveyance means 8 on the basis of the estimated result. From the relationship shown in FIG. 4, the longer the coding time the decoding time delays, and the timing for the start of sheet conveyance by the sheet conveyance means 8 is delayed.

For example, in the JPEG system of ITU-T standard, the coding process is composed of a series of processes such as blocking, discrete cosine transform, quantization and Hafman coding. The decoding process is composed, conversely thereto, of a series of processes such as Hafman coding, inverse quantization, inverse discrete cosine transform and reverse blocking, the coding process and the decoding process being contrasted to each other. In the case where when the coding process is determined, the decoding process is determined, the decoding speed can be grasped in advance from the coding speed. The relationship therebetween is set in advance in the corresponding table 21 so that when the decoding process is completed from the time (speed) required for the actual coding, the time (speed) predicted is estimated.

Also in the case of the general coding system, other than the JPEG system, for example, the system in which the coding process is contrasted to the decoding process, such as predicted coding, transform coding, block approximate coding and arithmetic coding, the decoding speed can be estimated from the coding speed in a manner similar to the former.

Figure 5:
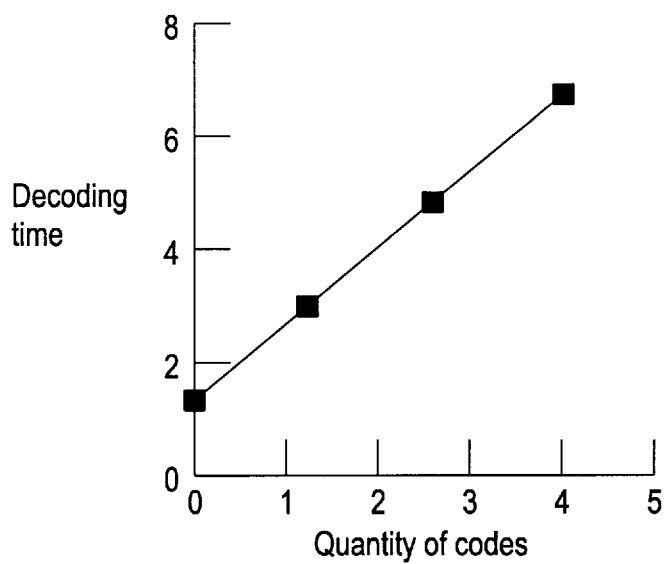
FIG. 5 is a graph showing one example of a relationship between the quantity of codes and decoding time.

FIG. 5 shows another example for estimating the decoding time. The decoding time is estimated on the basis of the quantity of codes in the coding process.

Accordingly, in the case of this example, the relationship between the quantity of codes and the decoding speed is grasped in advance and described on the corresponding table 22, and the coding unit 1 outputs the quantity of codes as coded information to the decoding speed estimation means 4. When the quantity of codes is input from the coding unit 1, the decoding time corresponding to the quantity of codes on the basis of the corresponding table 21 is retained in the table 22, and the decoding time retained in the table 22 is output as the estimated result 18 to the control means 6 in accordance with the estimation request. That is, from the relationship shown in FIG. 5, the more the quantity of codes the decoding time is delayed, and the timing for the start of conveyance of sheets by the sheet conveyance means 8 is delayed.

Particularly, in the Hafman decoding process out of the decoding system of JPEG system, the arithmetic amount of process changed depending on the content of image data. The more objects for process (i.e., the more the quantity of codes) the greater the arithmetic amount. Accordingly, the processing speed of the Hafman decoding process can be estimated from a degree of the quantity of codes. That is, in the case where when the quantity of codes is determined, the arithmetic amount of the decoding process is determined, the decoding speed can be estimated from the quantity of codes.

Also in the case of the general coding system, other than the JPEG system, for example, the system in which the arithmetic amount of the decoding process is determined depending on the quantity of code such as predicted coding, transform coding, vector quantization, sub-band coding, block approximate coding and arithmetic coding, the decoding speed can be estimated from the coding speed in a manner similar to the former.

Figure 6:
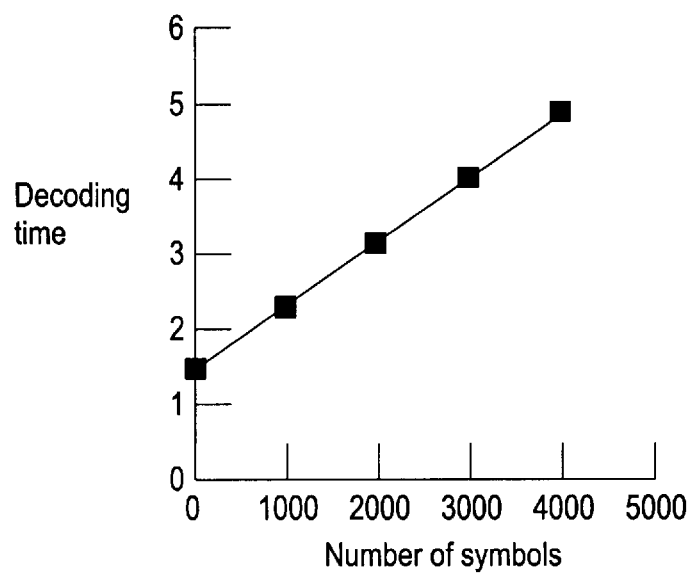
FIG. 6 is a graph showing one example of a relationship between the number of coded symbols and decoding time.

FIG. 6 shows another example for estimating the decoding time. The decoding time is estimated on the basis of the number of coded symbols in the coding process.

Accordingly, in the case of this example, the relationship between the number of coded symbols and the decoding speed is grasped in advance and described in the corresponding table 21. The coding unit 1 outputs the number of coded symbols as coded information to the decoding speed estimation means 4. When the number of coded symbols is input from the coding unit 1, the decoding time corresponding to the number of coded symbols on the basis of the corresponding table 21 is retained in the table 22, and the decoding time retained in the table 22 is output as the estimated result 18 to the control means 6 in accordance with the estimation request from the control means 6. That is, the more the number of coded symbols the decoding time is delayed, and the timing for the start of conveyance of sheets by the sheet conveyance means 8 is delayed.

Particularly in the Hafman decoding process out of the decoding system of JPEG system, for example, one code word is successively taken out of coded data, and a coded symbol corresponding to the code word is output. Therefore, the more objects (i.e., coded symbols) of the process the more the arithmetic amount. Accordingly, the processing speed of Hafman decoding can be estimated from the number of coded symbols. That is, in the case where when the number of coded symbols is determined, the arithmetic amount of the decoding process is determined, the decoding speed can be estimated from the number of coded symbols.

Also in the case of the general coding system, other than the JPEG system, for example, the system in which the arithmetic amount of the decoding process is determined depending on the number of coded symbols such as pre-dicted coding, transform coding, vector quantization, sub-band coding and block approximate coding, the decoding speed can be estimated from the number of coded symbols in a manner similar to the former.

As described above, the time at which image data every color component are prepared in the temporary memory means 5 by the decoding speed estimation means 4 is predicted, and the supplying timing of image data to the recording means 7Y, 7M, 7C and 7K is matched to the conveyance timing of recording sheets. Then, different kinds of images can be recorded on recording sheets continuously charged without trouble by the timing as shown in FIG. 7.

Figure 7:
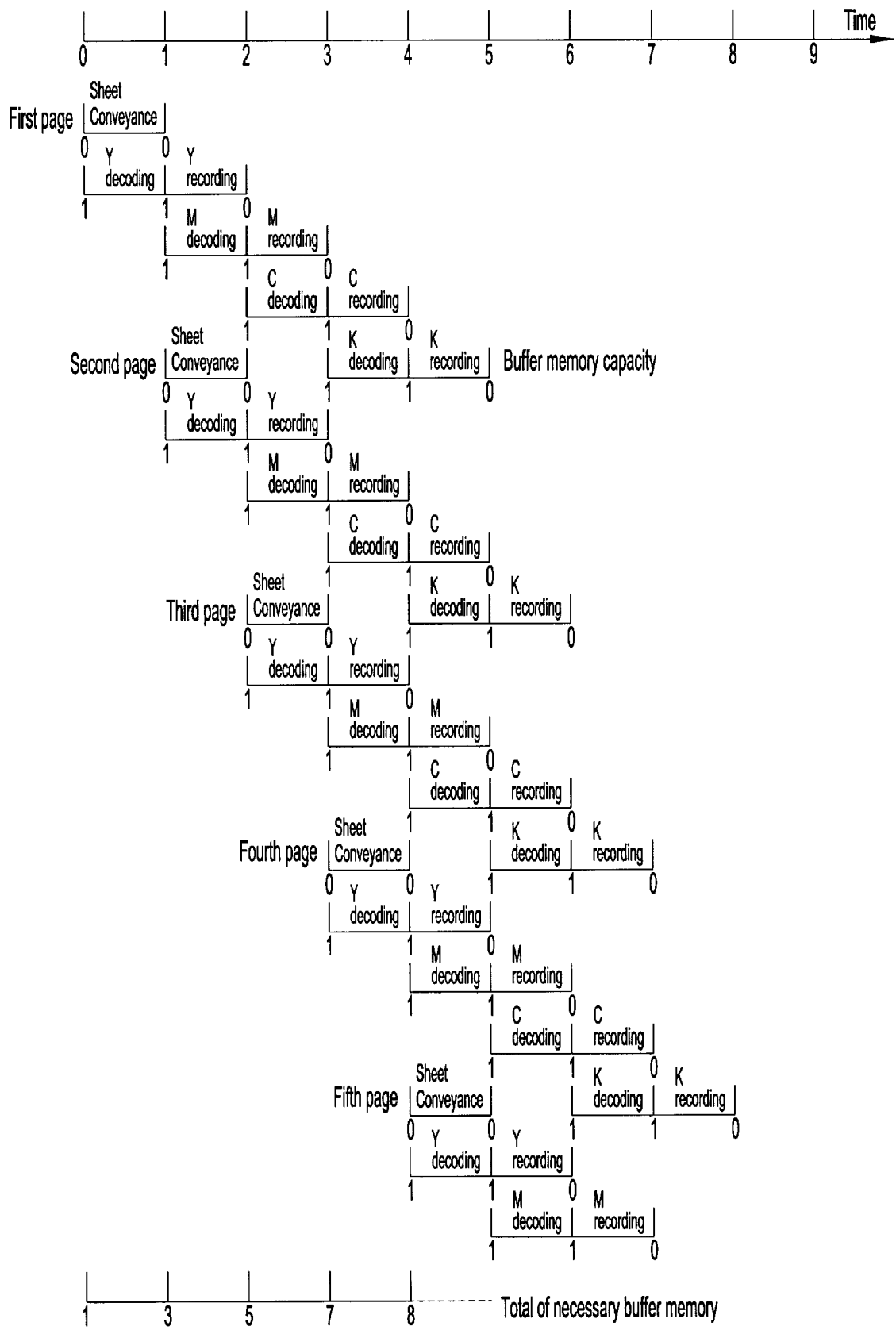
FIG. 7 shows the operating timing of an image forming apparatus according to one embodiment of the present invention.
Figure 17:
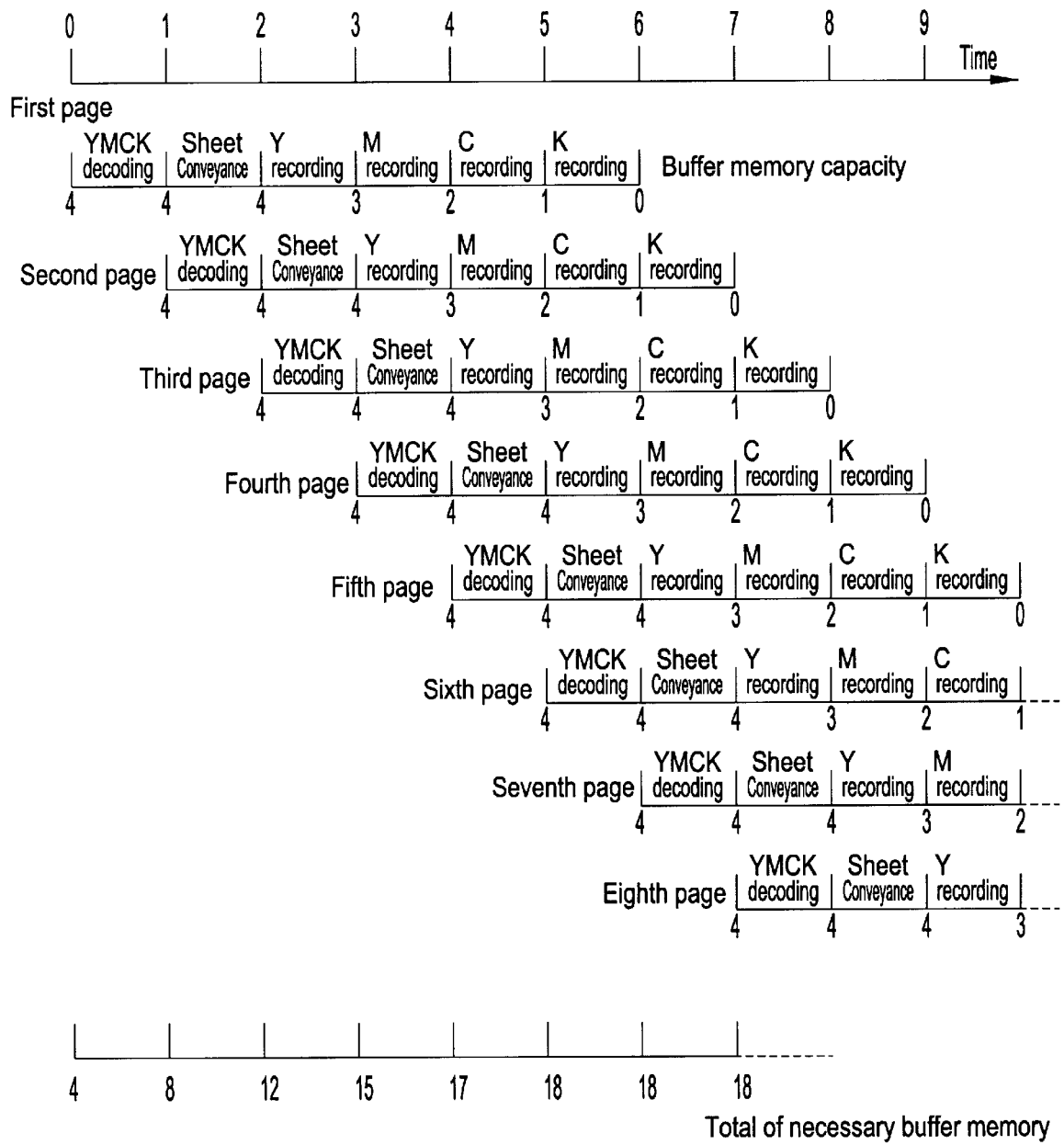
FIG. 17 shows the operating timing of a conventional image forming apparatus.

The example shown in FIG. 7 is the case where the recording means 7Y, 7M, 7C and 7K decode each page of different images at different intervals required for the recording process to record the images sheet by sheet, similarly to the example shown in FIG. 17. In FIG. 7, the axis of abscissae indicates the time. The capacity of the buffer memory 5 required is indicated with the memory capacity (1 plane) for one page and one color below the timing at which recording sheets for one page.

In the process for the first page, the control means 6 imparts the sheet feed instructions to the sheet conveyance means 8 to convey the recording sheet to a print start position of the leading recording means 7Y and imparts the decoding instructions to the decoding means 3 to decode image data (for one plane) of yellow (Y) and to retain the image data of yellow (Y) in the buffer memory 5. The recording means 7Y records an image with yellow ink on the recording sheet on the basis of the image data of yellow (Y), and the control means 6 imparts the decoding instructions to the decoding means 3 to decode image data (for one plane) of next magenta (M). This image data of next magenta (M) is retained in the buffer memory 5.

Next recording means 7M superposedly records images with magenta ink on the recording sheet on the basis of the image data of magenta (M), and the control means 6 imparts the decoding instructions to the decoding means 3 to decode image data (for one plane) of next cyan (C). This image data of cyan (C) is retained in the buffer memory 5.

Next recording means 7C superposedly records images with cyan ink on the recording she et on the basis of the image data of cyan (C), and the control means 6 imparts the decoding instructions to the decoding means 3 to decode image data (for one plane) of next black (K). This image data of black (K) is retained in the buffer memory 5. Next recording means 7K superposedly records images with black ink on the recording sheet on the basis of the image data of black (K).

As a result, after the time of 5 units, a color image superposedly recorded with colors of yellow (Y), magenta (M), cyan (C) and black (B) is printed on a recording sheet and ejected from the apparatus.

The sheet conveyance means is of a conveyance belt type. As recording sheets after the second page are conveyed, the recording sheet for the first page successively passes through the recording means 7Y, 7M, 7C and 7K for subjecting to the above-described recording process.

For the second page and thereafter, processing similar to that of the first page is carried out at the timing delayed by one unit time from the previous page. The capacity of the buffer memory 5 required every completion of the recording process for one plane is reduced "1" by "1," and pages are successively printed.

As a result, after the time of 4 units from the start of printing, the pipeline is filled. However, the data are decoded every color component and retained in the buffer memory 5 and the data every color component retained in the buffer memory 5 is immediately output. Therefore, if the buffer memory 5 has a memory capacity for 5 planes at a maximum, different images can be recorded on each of recording sheets continuously charged. Accordingly, the capacity of the buffer memory required for 18 planes can be reduced to 8 planes as compared with the conventional apparatus shown in FIG. 17.

Also in the case where in the above-described processing, there occurs a situation in which since data is decoded every color component and recorded, it requires the time over one unit time for the decoding process of a color data for the reason that the quality of codes is more than others, the time for completing the coding can be estimated. In the case where such an estimated result is obtained, the control means 6 can delay the timing for the sheet feed instructions to delay the sheet conveyance process after the process relating to the color data, whereby the supply of data to the recording means can be matched to the conveyance timing of recording sheets to print a color image without trouble.

Figure 8:
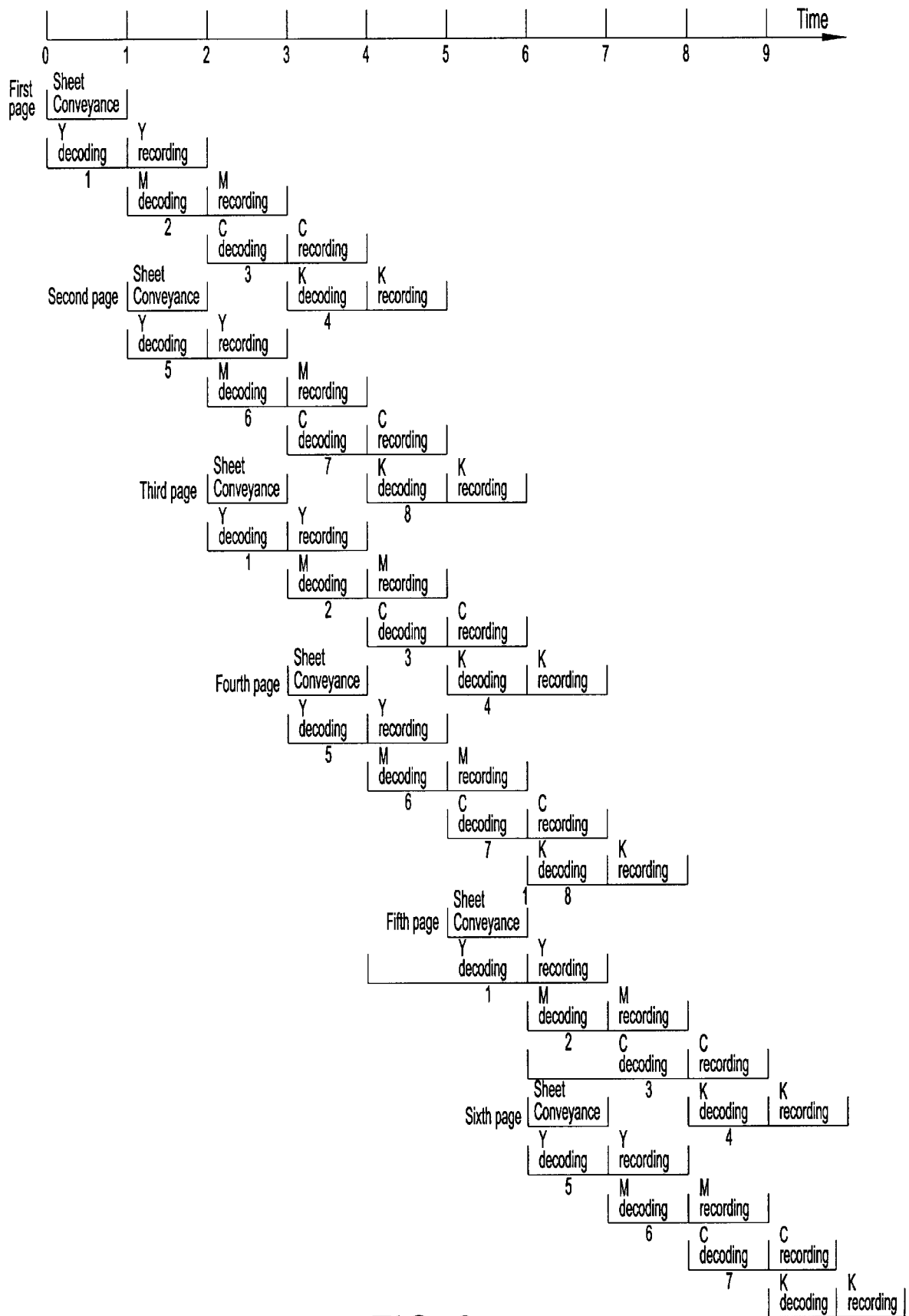
FIG. 8 shows the operating timing of an image forming apparatus according to one embodiment of the present invention.

FIG. 8 shows the case where in the decoding process for the fifth page, the time of two units is required for the decoding of yellow (Y) and cyan (C). The conveyance timing of recording sheets after the fifth page is delayed by one unit time to match the supply timing of data to the recording means.

Figure 9:
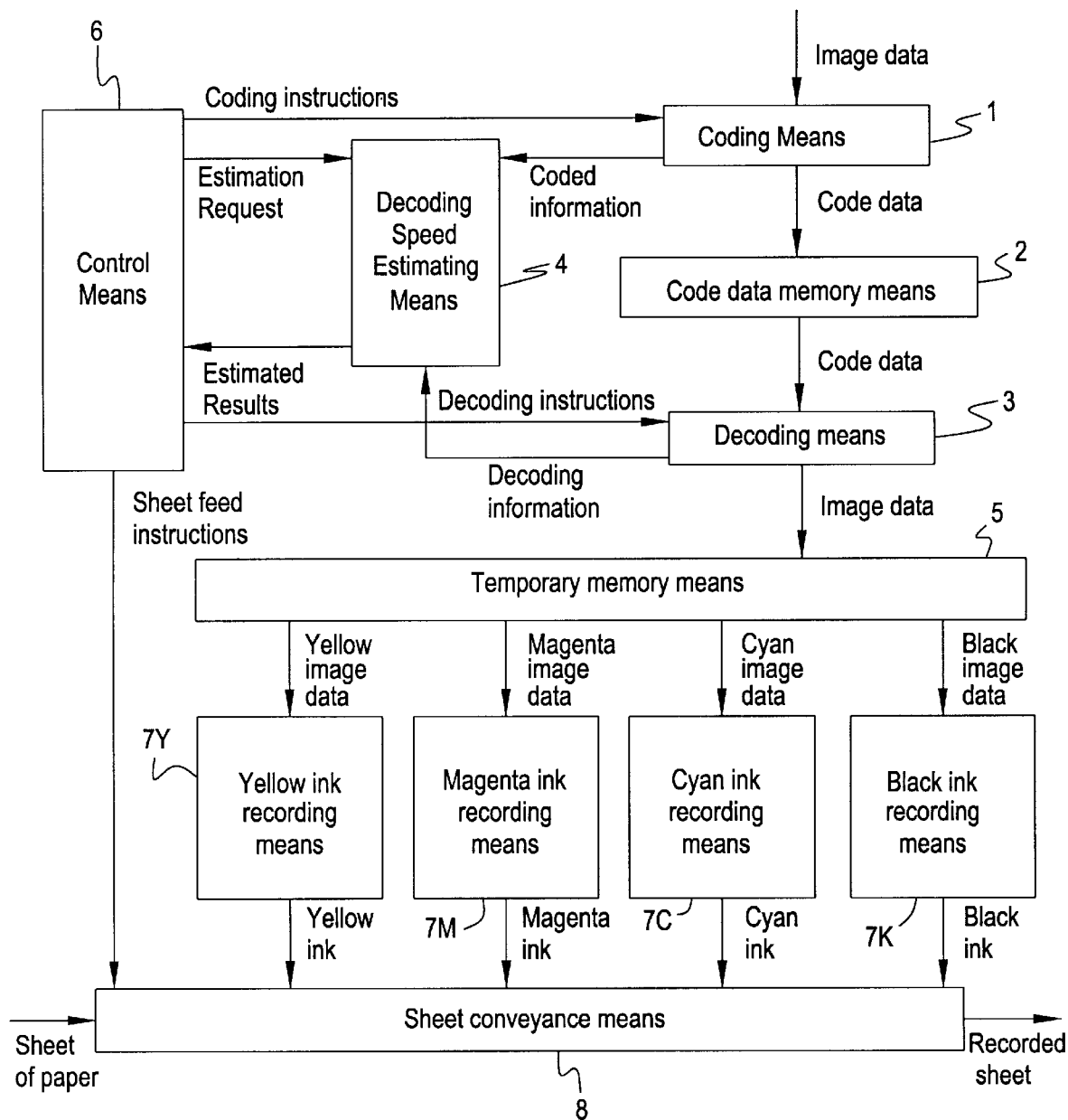
FIG. 9 is a schematic view showing the construction of an image forming apparatus according to a further embodiment of the present invention.

FIG. 9 shows another example in which the image forming apparatus of the present invention is embodied a tandem type color printer.

The present example is different in the estimation of the decoding time from that of the previous example. In the ensuing explanation, the same parts as those of the previous example are indicated by the same reference numeral, and a duplicate description is omitted.

That is, the decoding speed is input as decoding information from the decoding means 3 into the decoding speed estimation means 24 in the present embodiment. The decoding speed estimation means 24 retains the decoding information in the internal table, and outputs the decoding information to the control means 6 in accordance with the estimation request from the control means.

That is, in the present embodiment, code data are decoded in advance in the form of a sample before actual recording to a recording sheet, and the decoding speed (decoding information) at that time is retained in the decoding speed estimation means 24. In the actual recording process, the control means 6 determines whether or not the decoding is completed from the decoding speed till the recording sheets arrive at the recording means 7Y, 7M, 7C and 7K. If determination is made to in time, the control means 6 imparts the sheet feed instructions to the sheet conveyance means 8. Because of this, the control means 6 in the present embodiment also has the function of control for inputting the decoding instructions to the decoding means 3 to obtain the decoding information in advance.

Accordingly, according to the tandem type color printer constructed as described above, the decoding process is carried out in advance so that the decoding information is retained in the decoding speed estimation means 24, after which similarly to the explanation in connection with the embodiment shown in FIG. 1, the timing between the supply of data to the recording means 7Y, 7M, 7C and 7K is matched on the basis of the decoding information, images of various colors are superposedly recorded by the recording means 7Y, 7M, 7C and 7K on the recording sheets conveyed by the sheet conveyance means 8, and the recording sheet on which a color image is recorded is ejected.

Figure 10:
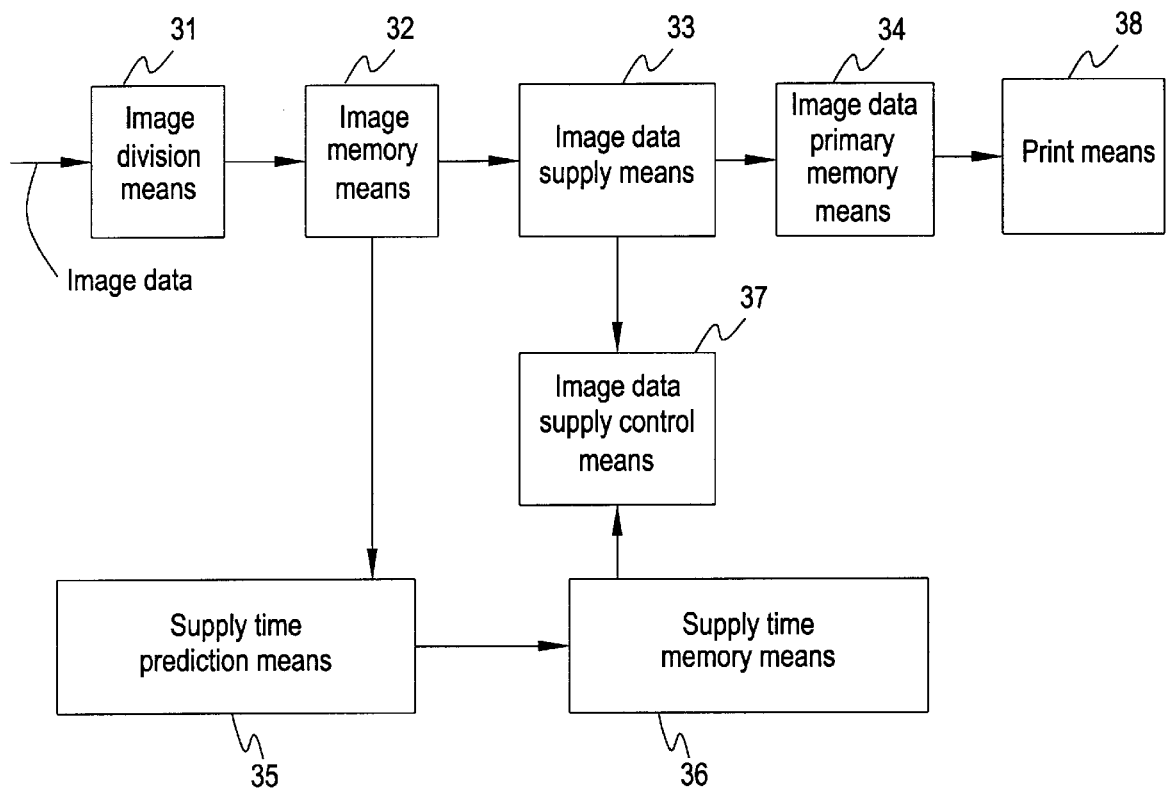
FIG. 10 is a schematic view showing the construction of an image forming apparatus according to another embodiment of the present invention.

FIG. 10 shows an example of an image forming apparatus for processing image data for one frame by dividing it into a plurality of partial image elements.

This image forming apparatus comprises image division means 31 for dividing input image data into a plurality of partial image elements, image memory means 32 for storing data of the divided partial image elements, image data supply means 33 for removing and supplying the partial image element data from the image memory means 32, image data temporary memory means 34 for temporarily retaining the partial image element data supplied from the image data supply means 33, supply time prediction means 35 for predicting the time required when the partial image element data are supplied from the image memory means 32 by the image data supply means 33, supply time memory means 36 for storing the time predicted by the supply time prediction means 35, image data supply control means 37 for controlling the supply by the image data supply means, and print means 38 for printing images on the recording sheet in accordance with the partial image element data retained in the image data temporary memory means 34.

Figure 11A:
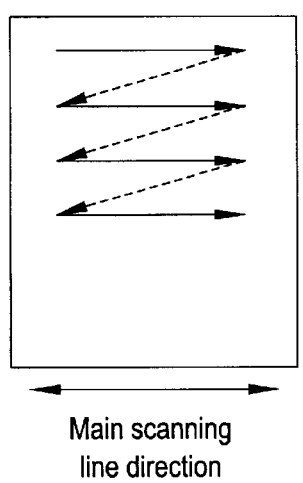
FIG. 11(A) and FIG. 11(B) is a conceptual view for explaining the division of image data.
Figure 11B:
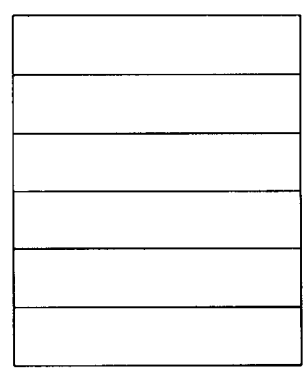
Figure 12:
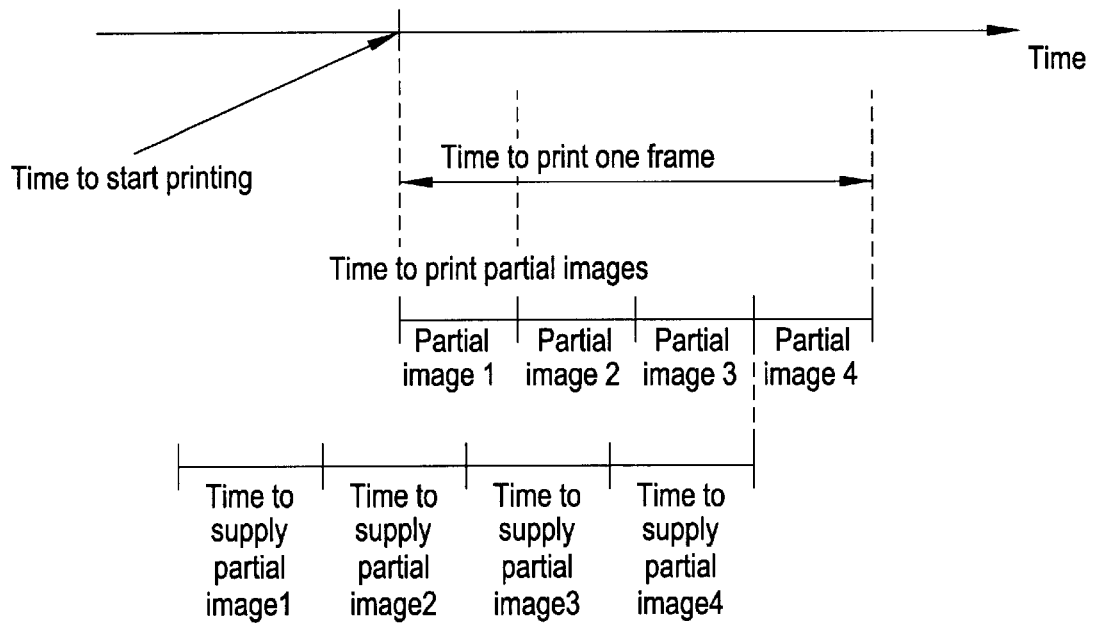
FIG. 12 shows the operating timing of an image forming apparatus according to a further embodiment of the present invention.

The image division means 31 divides image data for one frame input continuously primarily in a main scanning direction as shown in FIG. 11 (A) in a main scanning line as shown in FIG. 11 (B) and stores data of the thus divided partial image elements in the image memory means 32.

The image memory means 32 is constituted by a magnetic disk or the like to store the partial image element data in a writable and readable manner.

The image data supply means 33 is read and write means between the image memory means 32 and the image data temporary memory means 34 to read the partial image element data from the image memory means 32 to retain the same in the image data temporary memory means 34 under the control of the image data supply control means 37.

The image data temporary memory means 34 is a buffer memory with respect to the print means 38, which is constituted by a semiconductor memory which is expensive but high in access speed. This image data temporary memory means 34 is a memory which is smaller in capacity than one frame portion, which in the present embodiment is a capacity capable of retaining two partial image element data.

The supply time prediction means 35 predicts the time till the partial image element data read out of the image memory means 32 is retained in the image data temporary memory means 34 on the basis of the quantity of data of the partial image elements and the supplying speed by the image data supply means 33, and retains the predicted time in the supply time memory means 36.

The image data supply control means 37 controls the supply by the image data supply means 35 on the basis of the predicted time retained in the supply time memory means 36, and at the time of starting printing by the print means 38, places the partial image element data as an object to be printed to be retained in the image data temporary memory means 34.

The print means 38 performs printing with monochromatic ink. Partial images are successively printed on recording sheets conveyed by the sheet conveyance means (not shown) on the basis of the partial image element data retained in the image data temporary memory means 34.

The processing by the above image forming apparatus will be described by way of an example in which image data for one frame is divided into four partial images 1 to 4.

The partial image element data divided by the image division means 31 are stored in the image data memory means 32. In this division, the supply time prediction mean 35 predicts the time required to supply the partial image element data to the temporary memory means 34 and causes the supply time memory means 36 to retain the predicted time.

The image data supply control means 37 controls the supply by the image data supply means 33 on the basis of the predicted time retained in the supply time memory means 36, and the partial images based on the partial image element data are printed on the recording sheet by the print means 38.

In order that the leading partial image 1 is printed by the print means 38, the corresponding partial image element data should be retained in the image data temporary memory means 34 before the partial image 1 is printed. Therefore, the image data supply control means 37 determines if the partial image 1 should start to be supplied to the temporary memory means 34 how much time before the time to start the printing and causes the image data supply control means 33 to start supplying data of the partial image 1 from the time retroactive to the aforesaid time intervals or more as shown in FIG. 13.

Such a supply control is also true for the following partial images 2 to 4. The supply of the partial image element data is started from the time retroactive to time intervals based on the predicted time so that at the start of printing by the print means 38, element data of the partial images 1 to 4 are retained in the image data, temporary memory means 34.

As a result, the data supply can be controlled at the most adequate timing on the basis of the predicted time. Even if the temporary memory means 34 is not placed in capacity for one frame, the partial images 1 to 4 can be continuously printed by the print means 38 and the cost of the image forming apparatus can be reduced.

Figure 13:
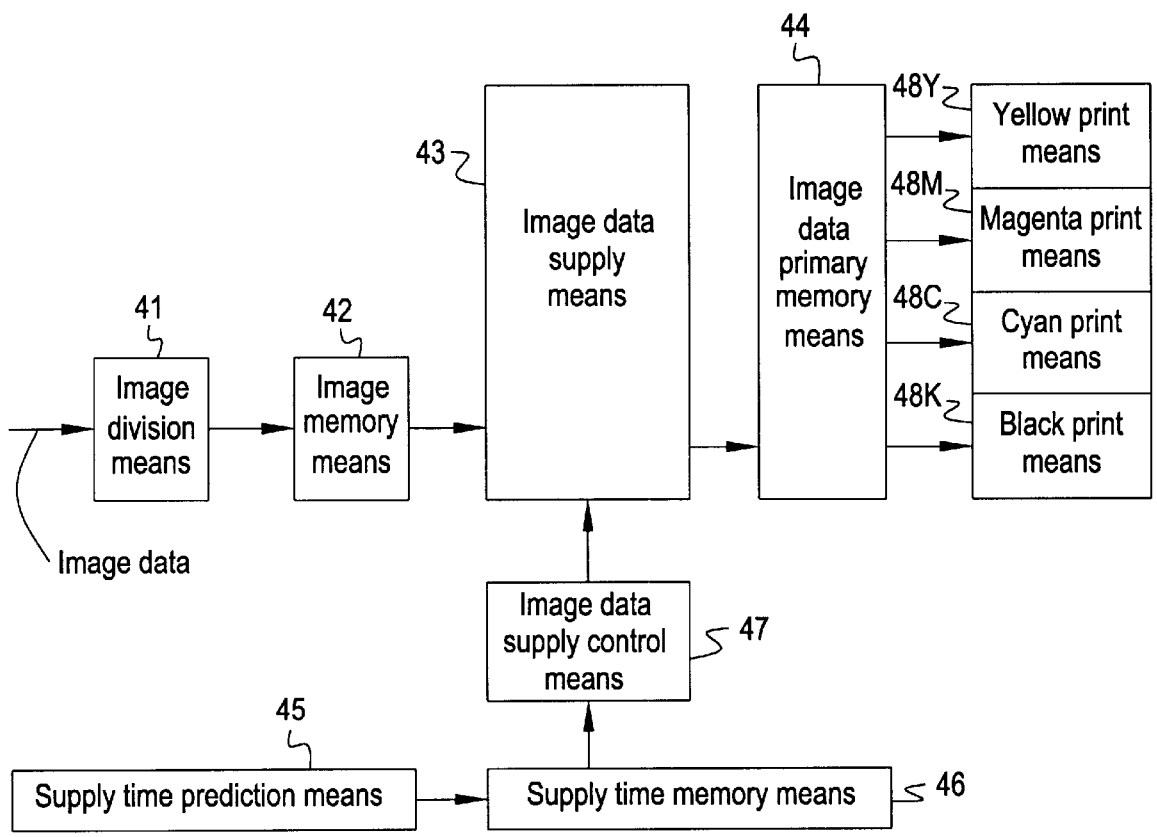
FIG. 13 is a schematic view showing the construction of an image forming apparatus according to still another embodiment of the present invention.
Figure 14:
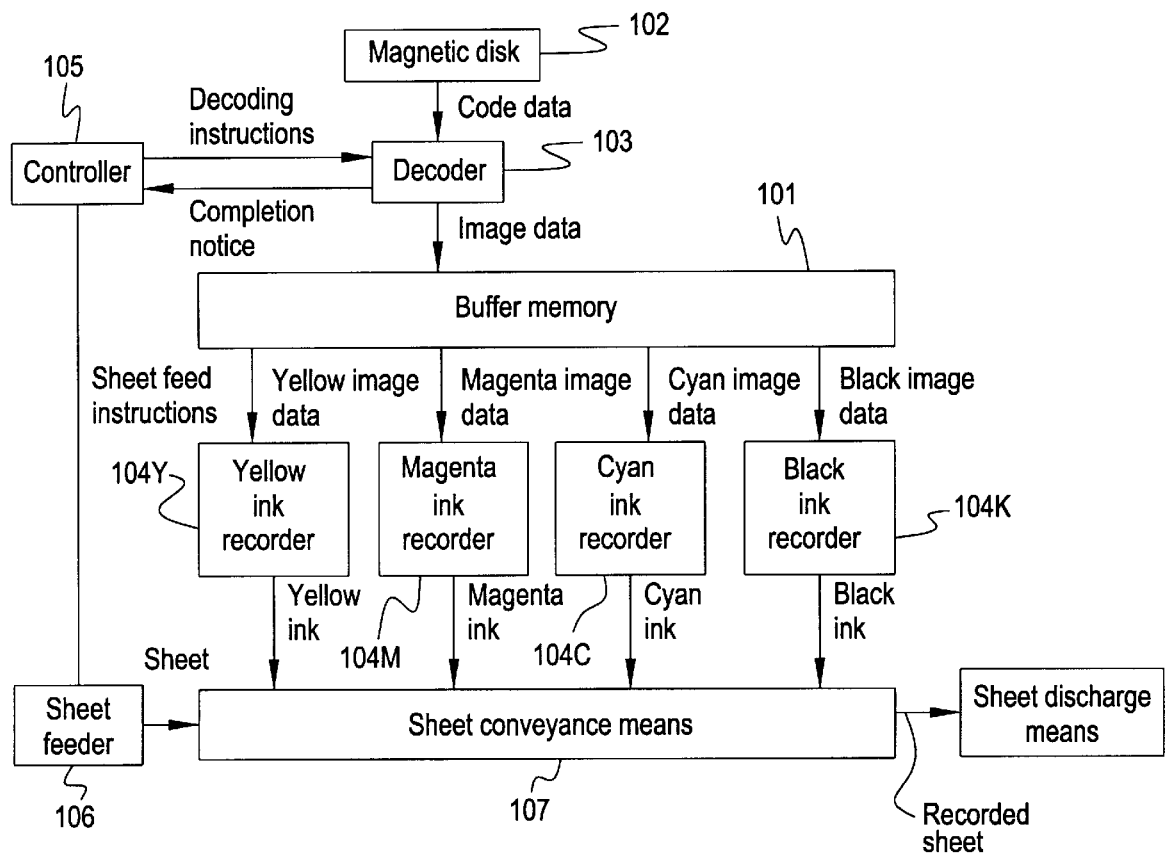
FIG. 14 is a schematic view showing the construction of a conventional image forming apparatus.
Figure 15:
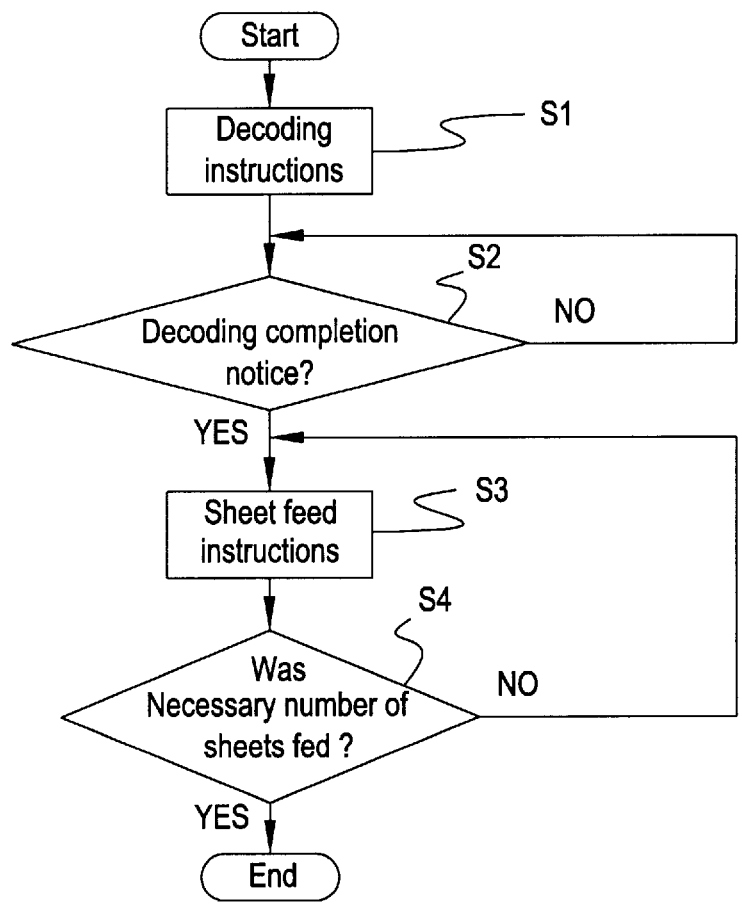
FIG. 15 is a flowchart showing the process procedure in the conventional image forming apparatus.
Figure 16:
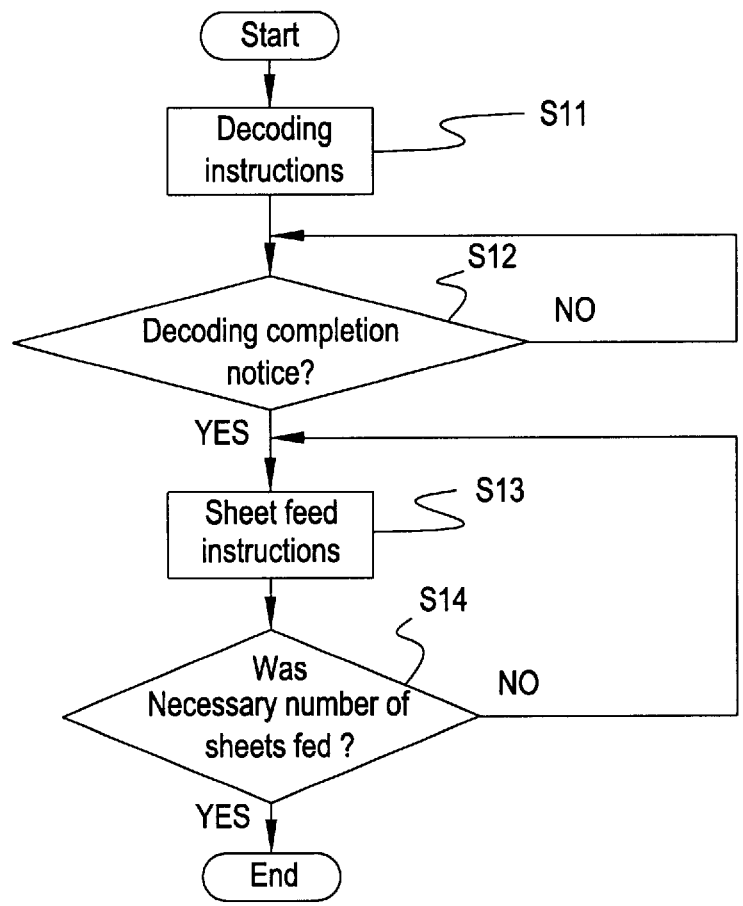
FIG. 16 is a flowchart showing the process procedure in the conventional image forming apparatus.

FIG. 13 shows another example in which the above-described image forming apparatus is embodied as a tandem type color printer.

This image forming apparatus comprises image division means 41 for dividing input image data into a plurality of partial image elements, image memory means 42 for storing data of the divided partial image elements, image data supply means 43 for removing and supplying the partial image element data from the image memory means 42, image data temporary memory means 44 for temporarily retaining the partial image element data supplied from the image data supply means 43, supply time prediction means 45 for predicting the time required when the partial image element data are supplied from the image memory means 42 by the image data supply means 43, supply time memory means 46 for storing the time predicted by the supply time prediction means 45, image data supply control means 47 for controlling the supply by the image data supply means, and print means 48Y, 48M, 48C and 48K for printing images on the recording sheet in accordance with the partial image element data retained in the image data temporary memory means 44.

The image division means 41 divides color image data input into data every color components of yellow (y), magenta (M), cyan (C) and black (K), divides these data in a direction a main scanning line as shown in FIG. 11 and stores data of the thus divided partial image elements every color into the image memory means 42.

The image memory means 42 is constituted by a magnetic disk or the like to store the partial image element data every color in a writable and readable manner.

The image data supply means 43 is read and write means between the image memory means 42 and the image data temporary memory means 44 to read the partial image element data from the image memory means 42 to retain the same in the image data temporary memory means 44 under the control of the image data supply control means 47.

The image data temporary memory means 44 is a buffer memory with respect to the print means 48Y, 48M, 48C and 48K, which is constituted by a semiconductor memory which is expensive but high in access speed. This image data temporary memory means 44 is a memory which is smaller in capacity than one frame portion of color image data, which in the present embodiment is a capacity capable of retaining two partial image element data.

The supply time prediction means 45 predicts the time till the partial image element data every color component read out of the image memory means 42 is retained in the image data temporary memory means 44 on the basis of the quantity of data every color of the partial image elements and the supplying speed by the image data supply means 43, and retains the predicted time in the supply time memory means 46.

The image data supply control means 47 controls the supply by the image data supply means 45 on the basis of the predicted time retained in the supply time memory means 46, and at the time of starting printing by the print means 48Y, 48M, 48C and 48K, places the partial image element data as an object to be printed to be retained in the image data temporary memory means 44.

The print means 48Y, 48M, 48C and 48K perform printing with color inks of yellow (Y), magenta (M), cyan (C) and black (B). Partial images are successively superposedly printed on recording sheets conveyed by the sheet conveyance means (not shown) on the basis of the partial image element data of color components retained in the image data temporary memory means 44.

In the above image forming apparatus, the partial image element data every color component divided by the image division means 41 are stored in the image data memory means 42. In this division, the supply time prediction mean 45 predicts the time required to supply the partial image element data every color component to the temporary memory means 44 and causes the supply time memory means 46 to retain the predicted time.

The image data supply control means 47 controls the supply by the image data supply means 43 on the basis of the predicted time retained in the supply time memory means 46, and the partial images based every color component on the partial image element data are printed on the recording sheet by the print means 48Y, 48M, 48C and 48K.

Also in this example, similarly to the previous example, in order that the partial images are printed by the print means 48Y, 48M, 48C and 48K, the corresponding partial image element data every color component should have been retained in the image data temporary memory means 44 before the partial images are started to be printed. Therefore, the image data supply control means 47 determines if the data should start to be supplied to the temporary memory means 44 how much time before the time to start the printing and causes the image data supply control means 43 to start supplying data of the partial image 1 from the time retroactive to the aforesaid time intervals or more.

As a result, the data supply can be controlled at the most adequate time on the basis of the predicted time. Even if the temporary memory means 44 is not placed in the capacity for one frame of color image data, the partial images every color component can be continuously superposedly printed by the print means 48Y, 48M, 48C and 48K. The cost of the image forming apparatus can be reduced.

As described above, according to the image forming apparatus of the present invention, processes such as the decoding and data supply are carried out, and these divided element data are retained in the temporary memory means which functions as a buffer for the recording every element data. Therefore, the quantity of data retained in the temporary memory means till completion of printing can be reduced.

For this reason, the capacity of the temporary memory means necessary for assuring data supply can be considerably reduced, and the cost required for expensive temporary memory means formed of a semiconductor memory can be reduced to considerably reduce the cost of apparatus.

Furthermore, since the recording process every element data carried out while conveying the recording media is carried out with the estimation of the completion time of processes such as the decoding and data supply. In connection with the corresponding element data, a sharp image can be recorded on the recording medium without occurrence of deterioration in quality such as a deviation of an image.

What is claimed is:

1. An image forming apparatus comprising:

data processing means for processing image data by dividing the image data for one frame into a plurality of element data;

temporary memory means for retaining the processed element data;

conveyance means for conveying recording medium;

recording means for recording image data on the recording medium utilizing the element data retained in the temporary memory means;

estimation means for predicting processing completion time for each element data according to said data processing means; and control means for controlling the conveyance means conveying the recording medium to a printing starting position of the recording medium based on the processing completion time for each element data according to said estimation means and causing the recording means to execute recording of the element data.

2. An image forming apparatus comprising:

decoding means for decoding a plurality of color component data of coded image data for one frame;

temporary memory means for retaining each of the decoded color component data;

conveyance means for conveying a recording medium;

recording means for superposedly printing image elements of color components on the recording medium based on the data retained in the temporary memory means;

estimation means for predicting process completion time for each color component data by the decoding means; and control means for controlling the conveyance means conveying the recording medium to a printing starting position of the recording medium positioned in a conveyance path based on estimation results of the estimation means and causing the recording means to execute printing of the color component data.

3. The image forming apparatus according to claim 2, further comprising: coding means for information-source coding image data, wherein image data coded by said coding means is decoded.

4. the image forming apparatus according to claim 3, wherein said estimation means predicts decoding completion time based on a coded speed of color component data by said coding means.

5. The image forming apparatus according to claim 2, wherein said estimation means predicts decoding completion time based on a quantity of codes of color component data.

6. The image forming apparatus according to claim 2, wherein the color component data comprises a plurality of coded symbols, and wherein said estimation means predicts decoding completion time based on a number of coded symbols of color component data.

7. The image forming apparatus according to claim 2, wherein a single color component data is processed to be decoded by the decoding means, and said estimation means estimates time required for said decoding process as decoding completion time with respect to thereafter color component data.

8. An image forming apparatus in which recording means prints an image on a recording medium based on data retained in temporary memory means, said apparatus comprising:

image division means for dividing image data for one frame into a plurality of partial image data divided in parallel with a main scanning line;

image memory means for storing the divided partial image data;

supply means for supplying the partial image data from the image memory means to the temporary memory means;

recording means for recording the partial image data on a recording medium based on the partial image data retained in the temporary memory means; and control means for matching timing between the supply processing of the partial image data by the supply means and the image printing by the recording means.

9. The image forming apparatus according to claim 8, further comprising: a plurality of recording means for printing image data for each color component, wherein the partial images for each color component based on the partial image data are superposedly printed by said recording means.

* * * * *